(12) United States Patent
Oishi et al.

(10) Patent No.: US 11,326,082 B2
(45) Date of Patent: May 10, 2022

(54) SELF-WELDING HIGH DIELECTRIC SILICONE RUBBER COMPOSITION AND SELF-WELDING HIGH DIELECTRIC TAPE

(71) Applicant: SHIN-ETSU CHEMICAL CO., LTD., Tokyo (JP)

(72) Inventors: Kazuhiro Oishi, Annaka (JP); Yoshiaki Koike, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 238 days.

(21) Appl. No.: 16/609,414

(22) PCT Filed: Mar. 23, 2018

(86) PCT No.: PCT/JP2018/011670
§ 371 (c)(1),
(2) Date: Oct. 29, 2019

(87) PCT Pub. No.: WO2018/207475
PCT Pub. Date: Nov. 15, 2018

(65) Prior Publication Data
US 2020/0056046 A1 Feb. 20, 2020

(30) Foreign Application Priority Data

May 11, 2017 (JP) .............................. JP2017-094413

(51) Int. Cl.
| | | |
|---|---|---|
| C09J 183/04 | (2006.01) | |
| C08K 3/36 | (2006.01) | |
| C08K 5/14 | (2006.01) | |
| C08K 3/22 | (2006.01) | |
| C08K 3/013 | (2018.01) | |
| C08G 77/18 | (2006.01) | |
| C08G 77/20 | (2006.01) | |
| C08G 77/398 | (2006.01) | |
| C08K 3/38 | (2006.01) | |
| C08L 83/06 | (2006.01) | |
| H01B 3/46 | (2006.01) | |

(52) U.S. Cl.
CPC ............ *C09J 183/04* (2013.01); *C08G 77/18* (2013.01); *C08G 77/20* (2013.01); *C08G 77/398* (2013.01); *C08K 3/013* (2018.01); *C08K 3/36* (2013.01); *C08K 3/38* (2013.01); *C08K 5/14* (2013.01); *C08L 83/06* (2013.01); *H01B 3/46* (2013.01); *C08K 2003/2227* (2013.01); *C08K 2003/2296* (2013.01); *C08K 2201/001* (2013.01); *C08K 2201/005* (2013.01); *C08K 2201/006* (2013.01); *C08L 2203/202* (2013.01); *C08L 2205/03* (2013.01)

(58) Field of Classification Search
CPC .. C08K 3/22; C08K 3/36; C08L 83/04; C09D 183/04; C09J 183/04

USPC ........................................................ 524/588
See application file for complete search history.

(56) References Cited

U.S. PATENT DOCUMENTS

| | | | |
|---|---|---|---|
| 4,108,833 A | 8/1978 | Hatanaak et al. | |
| 4,252,709 A * | 2/1981 | Skostins | ................... C08K 3/38 524/386 |
| 2014/0296387 A1 | 10/2014 | Matsukura et al. | |
| 2016/0012937 A1 * | 1/2016 | Shi | ........................... C08K 9/06 138/140 |

FOREIGN PATENT DOCUMENTS

| | | |
|---|---|---|
| JP | 2-229859 A | 9/1990 |
| JP | 7-207161 A | 8/1995 |
| JP | 9-143370 A | 6/1997 |
| JP | 9-231835 A | 9/1997 |
| JP | 2001-179833 A | 7/2001 |
| JP | 2003-331653 * | 11/2003 |
| JP | 2013-177558 A | 9/2013 |

(Continued)

OTHER PUBLICATIONS

Machine translation of JP 2003-331653 (no date).*
Machine translation of JP 09-143370 (no date).*
Machine translation of JP 62-41171 B (no date).*
International Search Report for PCT/JP2018/011670 (PCT/ISA/210) dated Jun. 5, 2018.
Written Opinion of the International Searching Authority for PCT/JP2018/011670 (PCT/ISA/237) dated Jun. 5, 2018.

(Continued)

*Primary Examiner* — Marc S Zimmer
(74) *Attorney, Agent, or Firm* — Birch, Stewart, Kolasch & Birch, LLP

(57) ABSTRACT

Provided are a self-welding high dielectric silicone rubber composition and a self-welding high dielectric tape. The self-welding high dielectric silicone rubber composition comprises: (A) 100 parts by mass of an organopolysiloxane represented by an average composition formula (1) and having, in a molecule, at least two alkenyl groups bonded to silicon atoms, $R^1_n SiO_{(4-n)/2}$ (1), (in the formula, $R^1$ represents the same or different, unsubstituted or substituted monovalent hydrocarbon group and n is a positive number of 1.95 to 2.04); (B) 10 to 100 parts by mass of hydrophobic fumed silica having a specific surface area obtained by the BET adsorption method of 50 m²/g or larger; (C) 100 to 300 parts by mass of a conductive complex oxide; (D) 0.1 to 50 parts by mass of a boric acid or a boric acid compound; (E) 1 to 10 parts by mass of a diorganopolysiloxane capped at both molecular terminals with alkoxy groups; and (F) 0.01 to 10 parts by mass of a curing agent comprising an acyl organic peroxide. The self-welding high dielectric silicone rubber composition can be hot-air vulcanized under normal pressure by extrusion molding or roll forming with calender rolls.

7 Claims, No Drawings

(56) References Cited

FOREIGN PATENT DOCUMENTS

| | | |
|---|---|---|
| JP | 2015-76168 A | 4/2015 |
| JP | 2015-153514 A | 8/2015 |
| JP | 2017-2218 A | 1/2017 |
| JP | 2017-39833 A | 2/2017 |
| WO | WO 2013/037148 * | 3/2013 |

OTHER PUBLICATIONS

Chinese Office Action for Chinese Application No. 201380030559.5, dated Jan. 28, 2022, with English translation.

* cited by examiner

SELF-WELDING HIGH DIELECTRIC SILICONE RUBBER COMPOSITION AND SELF-WELDING HIGH DIELECTRIC TAPE

TECHNICAL FIELD

The present invention relates to a self-adhesive high dielectric silicone rubber composition that can be cured well by normal pressure hot air vulcanization (HAV), maintains a high relative dielectric constant, and provides a high dielectric insulating rubber cured product having high hermeticity and rubber strength, and a self-adhesive high dielectric tape.

BACKGROUND ART

In a case where a CV cable (Cross-linked polyethylene insulated PVC sheathed cable) is connected to the CV cables, a transformer, an overhead wire, or the like, an outer semiconductive layer at an end of the CV cable needs to be set as a specified length. However, simply removing the outer semiconductive layer concentrates an electric field at the end of the outer semiconductive layer and impairs the electrical characteristics, and therefore, in order to alleviate or suppress this electric field concentration, an electric field relaxation layer made of a dielectric having a relative dielectric constant higher than a dielectric constant of a cable insulator is provided at a cut-off portion of a cable shielding layer. This is based on the principle that refraction occurs when equipotential lines and electrical stress pass through substances having different dielectric constants (Patent Document 1: JP-A 2015-153514). Examples of the rubber composition with improved relative dielectric constant include a composition in which a high dielectric substance such as dielectric ceramics or carbon black including metal oxide and barium titanate is mixed to a base polymer such as polyolefin, ethylene-propylene rubber, an ethylene-propylene-diene copolymer, acrylic rubber, and nitrile rubber (Patent Document 2: JP-A 2017-002218). Further, the cable end is often exposed outdoors, and thus a high dielectric material in which a high dielectric substance is mixed to silicone rubber having excellent weather resistance has been developed (Patent Document 3: JP-A 2013-177558). On the other hand, since a molded rubber molding is inserted into a power cable terminal while being spread out, there was a problem of artificial workability such as contamination of an air layer, which can cause dielectric breakdown during construction, variations in characteristics due to individual differences among workers, and time-consuming insertion.

Therefore, a high dielectric tape has been developed in which a high dielectric rubber is formed into a tape shape to impart airtight performance and antifouling performance to a power cable termination structure, thereby improving work efficiency (Patent Document 4: JP-A 2015-076168).

In addition, a self-adhesive high dielectric silicone rubber composition that maintains high relative dielectric constant by using alkyl peroxide as a curing agent, includes a conductive double oxide and a boric acid compound, and has hermeticity and rubber strength has been proposed (Patent Document 5: JP-A 2017-039833); however, if vulcanized by normal pressure hot air vulcanization, the curing is insufficient when vulcanization inhibition by oxygen occurs, and thereby the intended rubber characteristics are not obtained. Alternatively, there is a problem in that a process of sufficiently removing oxygen is needed in advance.

In order to improve the relative dielectric constant of the rubber material used for these applications, a π electron transfer type conductive substance such as carbon black or carbon fiber is often used as a conductivity imparting material. However, in a case where a silicone rubber composition using carbon black as a conductivity imparting material is continuously molded and vulcanized to be formed in a tape having a long length by extrusion molding or the like, a vulcanization system has a great restriction. That is, in a case where organic peroxide-vulcanized, if acyl peroxides such as benzoyl peroxide and 2,4-dichlorobenzoyl peroxide, which are usually used in normal pressure hot air vulcanization (HAV) of the general silicone rubber composition, are used in a system containing carbon black, vulcanization is not sufficiently performed due to the influence of carbon black, and a satisfactory molded product cannot be obtained. Further, in the alkyl peroxides such as di-tert-butyl peroxide and dicumyl peroxide, although pressure molding with a mold is possible, there is a problem in that under the normal pressure hot air vulcanization, the surface vulcanization is not sufficient due to the influence of oxygen in the air, and thereby a satisfactory product cannot be obtained.

For this reason, in a case where a silicone rubber composition containing carbon black is to be hot-air vulcanized under normal pressure, a conventional method using addition vulcanization has been generally employed. In this method, a platinum addition reaction catalyst is added to an organopolysiloxane having an alkenyl group and an organohydrogenpolysiloxane having a silicon-bonded hydrogen atom that undergoes an addition reaction with the alkenyl group, followed by being cured. However, this addition reaction method has a disadvantage in that a production range is limited, for example, a hydrosilylation reaction is easily inhibited by catalyst poison, and a storage period is short due to the reaction proceeding even at room temperature, which is a large problem at the time of molding.

PRIOR ART DOCUMENTS

Patent Documents

Patent Document 1: JP-A 2015-153514
Patent Document 2: JP-A 2017-002218
Patent Document 3: JP-A 2013-177558
Patent Document 4: JP-A 2015-076168
Patent Document 5: JP-A-2017-039833

SUMMARY OF INVENTION

Technical Problem

The present invention has been made in view of the above circumstances, and an object thereof is to provide a self-adhesive high dielectric silicone rubber composition that can be cured well by normal pressure hot air vulcanization (HAV), maintains a high relative dielectric constant, and provides a high dielectric insulating rubber cured product having high hermeticity and rubber strength, and a self-adhesive high dielectric tape.

Solution to Problem

Making extensive investigations to attain the above object, the inventors of the present invention have found that by using a silicone rubber composition specifically comprising: (A) organopolysiloxane, (B) fumed silica whose surface is hydrophobized with chlorosilane, hexamethyldisilazane, or the like, (C) conductive complex oxide, (D) boric acid or a boric acid compound, (E) diorganopolysiloxane capped at both molecular terminals with alkoxy groups, and (F) curing agent consisting of acyl organic peroxide, there is no inhibition of curing due to the catalyst poisons by addition vulcanization, sufficient storage time is obtained. With this, a high dielectric insulating rubber cured product which has favorable self-adhesive properties, can be cured well by normal pressure hot air vulcanization (HAV) during extrusion molding and calendering molding, and thus maintains a high relative dielectric constant to have high hermeticity and rubber strength can be obtained. Therefore, the high dielectric insulating rubber cured product is suitable as a tape member that can effectively alleviate the electric field concentration and is used for electric field relaxation layers such as a power cable connection portion and a terminal connection portion. With such a configuration, the present invention has been accomplished.

Accordingly, the present invention provides a self-adhesive high dielectric silicone rubber composition and a self-adhesive high dielectric tape capable of normal pressure hot air vulcanization (HAV) by the following extrusion molding or roll forming with calender rolls.

[1]

A self-adhesive high dielectric silicone rubber composition comprising:

(A) 100 parts by weight of an organopolysiloxane represented by an average compositional formula (1) and having, in a molecule, at least two alkenyl groups bonded to silicon atoms:

$R^1_n SiO_{(4-n)/2}$       (1)

wherein, $R^1$ represents the same or different, unsubstituted or substituted monovalent hydrocarbon group and n is a positive number of 1.95 to 2.04;

(B) 10 to 100 parts by weight of hydrophobic fumed silica having a specific surface area as measured by a BET adsorption method of 50 $m^2/g$ or larger;

(C) 100 to 300 parts by weight of a conductive complex oxide;

(D) 0.1 to 50 parts by weight of a boric acid or a boric acid compound;

(E) 1 to 10 parts by weight of a diorganopolysiloxane capped at both molecular terminals with alkoxy groups; and (F) 0.01 to 10 parts by weight of a curing agent consisting of acyl organic peroxide, wherein the self-adhesive high dielectric silicone rubber composition is able to be hot-air vulcanized under normal pressure by extrusion molding or roll forming with calender rolls.

[2]

The self-adhesive high dielectric silicone rubber composition according to [1], wherein the conductive complex oxide as component (C) is a solid solution of zinc oxide and aluminum oxide and/or a solid solution of zinc oxide and titanium oxide, and a specific resistance value of the complex oxide is 0.1 to 10.0 Ω·m.

[3]

The self-adhesive high dielectric silicone rubber composition according to [1] or [2], wherein an average particle size of the conductive complex oxide as component (C) is 0.8 μm or less.

[4]

The self-adhesive high dielectric silicone rubber composition according to any one of [1] to [3], wherein the component (D) is polyorganoborosiloxane.

[5]

The self-adhesive high dielectric silicone rubber composition according to any one of [1] to [4], wherein an elongation at break of a cured product of the silicone rubber composition is 500% to 1,200%.

[6]

The self-adhesive high dielectric silicone rubber composition according to any one of [1] to [5], wherein a relative dielectric constant of the cured product of the silicone rubber composition is 10 or more, and a volume resistivity is $1.0 \times 10^{12}$ to $1.0 \times 10^{17}$ Ω·cm.

[7]

The self-adhesive high dielectric silicone rubber composition according to any one of [1] to [6] for a self-adhesive high dielectric tape that is wound around a terminal portion of a power cable to alleviate an electric field concentrated on the terminal portion of the power cable.

[8]

A self-adhesive high dielectric tape comprising a cured product of the self-adhesive high dielectric silicone rubber composition according to any one of [1] to [7].

Advantageous Effects of Invention

According to the present invention, it is possible to provide a self-adhesive high dielectric silicone rubber composition that can be cured well by normal pressure hot air vulcanization (HAV), maintains a high relative dielectric constant, and provides a high dielectric insulating rubber cured product having high hermeticity and rubber strength, and a self-adhesive high dielectric tape that can effectively alleviate the electric field concentration and is used for electric field relaxation layers such as a power cable connection portion and a terminal connection portion.

DESCRIPTION OF EMBODIMENTS

Hereinafter, the present invention is specifically described. Note that, in the present invention, specific surface areas of a reinforcing filler and a conductive complex oxide are values measured by a BET adsorption method. Further, a millable silicone rubber composition is usually a high-viscosity non-liquid silicone rubber composition having no self-fluidity at room temperature (25° C.), and means a silicone rubber composition that can be uniformly kneaded under shear stress using a roll mill (for example, a two-roll mill or a three-roll mill) and the like. In addition, organopolysiloxane raw rubber means a non-liquid organopolysiloxane component having a high degree of polymerization (high viscosity) of 100 to 100,000 and usually not self-fluidity at room temperature (25° C.).

The silicone rubber composition of the present invention contains components (A), (B), (C), (D), (E), and (F).

(A) Organopolysiloxane

The organopolysiloxane as component (A) is a main component (base polymer) of the present composition, is represented by the following average compositional formula (1), and has at least 2 or preferably 2 to 10,000 alkenyl groups bonded to silicon atoms in one molecule:

$R^1_n SiO_{(4-n)/2}$       (1)

wherein $R^1$ represents the same or different, unsubstituted or substituted monovalent hydrocarbon group and n is a positive number of 1.95 to 2.04.

In the formula (1), $R^1$ is a monovalent hydrocarbon group having 1 to 20, preferably 1 to 12, and more preferably 1 to 8 carbon atoms. Examples of the monovalent hydrocarbon group represented by $R^1$ include an alkyl group such as a methyl group, an ethyl group, a propyl group, and a butyl group, and a cycloalkyl group such as a cyclohexyl group, an alkenyl group such as a vinyl group, an aryl group, a butenyl group, and a hexenyl group, an allyl group such as a phenyl group and a tolyl group, and an aralkyl group such as β-phenylpropyl group. Some or all of hydrogen atoms bonded to carbon atoms of these groups may be substituted with a halogen atom, and examples thereof include a 3,3,3-trifluoropropyl group. Among these, a methyl group, a vinyl group, a phenyl group, and a trifluoropropyl group are preferable, and a methyl group and a vinyl group are more preferable. Among these, in particular, among the monovalent hydrocarbon groups represented by $R^1$ in the molecule, a methyl group is preferably 50% by mole or more, a methyl group is more preferably 80% by mole or more, and all $R^1$ except for an alkenyl groups are further preferably methyl groups.

In the Formula (1), n is a positive number of 1.95 to 2.04, preferably a positive number of 1.98 to 2.02. If the n value is not in the range of 1.95 to 2.04, the resulting cured product may not exhibit sufficient rubber elasticity.

Further, the organopolysiloxane as component (A) needs to have at least two alkenyl groups in one molecule. In the Formula (1), 0.001% to 10% by mole, particularly 0.01 to 5% by mole of $R^1$ is preferably an alkenyl group. The alkenyl group is preferably a vinyl group or an allyl group, and particularly preferably a vinyl group.

The average polymerization degree of the organopolysiloxane as component (A) is usually 100 to 100,000, preferably 1,000 to 100,000, more preferably 3,000 to 50,000, and particularly preferably 4,000 to 20,000. In a case where the average polymerization degree is less than 100, the silicone rubber composition does not satisfy the properties as a millable rubber, and roll kneadability and the like are undesirably remarkably deteriorated. Note that, the average polymerization degree can be obtained as a weight average polymerization degree in terms of polystyrene in GPC (gel permeation chromatography) analysis measured under the following conditions.

Measurement Conditions

Developing solvent: Toluene
Flow rate: 1 mL/min
Detector: Differential refractive index detector (RI)
Column: KF-805L×2 (manufactured by Shodex)
Column temperature: 25° C.
Sample injection volume: 30 μL
(Toluene solution with a concentration of 0.2% by weight)

The organopolysiloxane as component (A) is not particularly limited as long as it satisfies the conditions for the number of alkenyl groups in one molecule and the average polymerization degree, and is preferably linear diorganopolysiloxane which has a main chain consisting of repeating diorganosiloxane units ($R^1_2SiO_{2/2}$, $R^1$ is as described above, and the same shall apply hereinafter) and is capped at both molecular terminals with a triorganosiloxy group ($R^1_3SiO_{1/2}$), is preferably those capped at both molecular terminals with a trimethylsiloxy group, a dimethylvinylsiloxy group, a dimethylhydroxysiloxy group, a methyldivinylsiloxy group, a trivinylsiloxy group, and the like, and is particularly preferably those capped with a siloxy group having at least one vinyl group. These organopolysiloxanes may be used alone or two or more kinds thereof having different polymerization degrees and molecular structures may be used in combination.

(B) Hydrophobic Fumed Silica

The hydrophobic fumed silica as component (B) acts as a filler that imparts excellent mechanical properties to the silicone rubber composition, and a silanol (SiOH) group present on the surface is hydrophobized. The specific surface area by the BET method of the hydrophobic fumed silica as component (B) needs to be 50 $m^2$/g or more, and is preferably 100 to 400 $m^2$/g. If the specific surface area is less than 50 $m^2$/g, the reinforcing effect by the component (B) may be insufficient.

As the hydrophobic fumed silica as component (B), those surface-treated with an organosilicon compound such as organopolysiloxane, organopolysilazane, chlorosilane, or alkoxysilane are used. These silicas may be used alone or two or more kinds thereof may be used in combination. From the viewpoint of the hydrophobicity of the fumed silica surface, reinforcing fumed silica surface-treated with an organosilicon compound in advance is preferable, and foaming due to moisture volatilization during the normal pressure hot air vulcanization can be suppressed. The component (B) may be used alone or two or more kinds thereof may be used in combination.

As the hydrophobic fumed silica as component (B), commercially available products can be used, and examples thereof include fumed silica whose surface has been subjected to a hydrophobic treatment, such as AEROSIL series such as AEROSIL R-972 and AEROSIL R-974 (produced by Nippon Aerosil Co., Ltd.), and REOLOSIL DM-20S, 30S (produced by Tokuyama Corporation).

The mixing amount of the hydrophobic fumed silica as component (B) is 10 to 100 parts by weight, preferably 15 to 80 parts by weight, more preferably 15 to 60 parts by weight per 100 parts by weight of the organopolysiloxane as component (A). If this mixing amount deviates from the above range, not only the processability of the resulting silicone rubber composition is lowered, but also the mechanical properties such as the tensile strength and tear strength of a silicone rubber cured product obtained by curing the silicone rubber composition may be insufficient.

(C) Conductive Complex Oxide

Examples of the conductive complex oxide include a solid solution of zinc oxide (ZnO) and aluminum oxide ($Al_2O_3$) and a solid solution of zinc oxide (ZnO) and titanium oxide ($TiO_2$). Among these, a solid solution of zinc oxide and aluminum oxide is preferable, and a conductive complex oxide obtained by doping zinc oxide with aluminum atoms is particularly preferable. As the reason for this, in addition to the fact that the dispersibility is favorable for polymer dispersion of a resin or the like, the processability is excellent and the hardness of the powder itself represented by Mohs hardness is relatively low, there are advantages in that due to many grades of commercially available products, there is a wide range of choices in terms of particles, dispersibility, and shape, and the cost is stable.

As an example of a method for producing a conductive complex oxide, there is a method in which one or two or more kinds of different metal ions are dispersed in crystal particles of a certain metal oxide and calcined in a reducing atmosphere. For example, in a case of the conductive complex oxide as a solid solution of zinc oxide and aluminum oxide, it can be obtained by treating zinc oxide and aluminum salt in an aqueous ammonium salt solution and calcining in a hydrogen atmosphere after dehydration (refer to JP-B S62-41171). In addition, commercially available products can be used as the conductive complex oxide, for example, as conductive zinc white obtained by doping zinc oxide with aluminum atoms, conductive zinc white (produced by Honjo Chemical Corporation), conductive zinc oxide 23-K (produced by HAKUSUI TECH CO., LTD.), and the like can be used.

Many of such conductive complex oxides have conductivity as an n-type semiconductor, and the conductivity is characterized by being hardly affected by humidity or environmental factors. The mechanism by which the conductivity is generated is considered to be because a surplus or a deficient electron pair of metal atoms having a different valence that is partially substituted by doping causes semiconducting conductivity.

In a case where a solid solution of zinc oxide and aluminum oxide and/or a solid solution of zinc oxide and titanium oxide is/are used as the conductive complex oxide of component (C), the specific resistance value of the complex oxide is preferably 0.1 to 10.0 Ω·m.

The specific resistance value is used by mixing a specific resistance value of less than 0.1 to 1.0 Ω·m of (C-1) and a specific resistance value of 5.0 to 10.0 Ω·m of (C-2) in the solid solution of zinc oxide and aluminum oxide and/or the solid solution of zinc oxide and titanium oxide as component (C), and with this, the cured product of the composition as described below can be prepared in a range of a relative dielectric constant of 10 or more and a volume resistivity of $1.0 \times 10^{12}$ to $1.0 \times 10^{17}$ Ω·cm.

The weight ratio of (C-1) to (C-2) of the conductive complex oxide is preferably (C-1)/(C-2)=5/95 to 95/5, and is more preferably 10/90 to 90/10. If a relative dielectric constant of 10 or more is to be obtained only (C-1) with the specific resistance value of 0.1 to less than 1.0 Ω·m, the mixing amount has to be increased as described below, as a result, the rubber strength and rubber elasticity of the cured rubber may be deteriorated. In addition, in a case of only (C-2) with the specific resistance value of 5.0 to 10.0 Ω·m, the relative dielectric constant is increased, but it exhibits semiconductivity, and thereby the insulation may be deteriorated.

Such a conductive complex oxide as component (C) has an average particle size of preferably 0.8 μm or less, and particularly preferably 0.5 μm or less. The lower limit is not particularly limited, and is usually about 0.001 μm. If the particle size of the conductive complex oxide is too large, rubber elasticity may be deteriorated. The average particle size can be measured as a cumulative volume average value $D_{50}$ using a particle size distribution measuring apparatus by a laser diffraction method or the like.

The mixing amount of the conductive complex oxide as component (C) is 100 to 300 parts by weight, preferably 150 to 280 parts by weight, more preferably 170 to 250 parts by weight per 100 parts by weight of the component (A). If the mixing amount is less than 100 parts by weight, the desired high dielectric constant characteristics may not be obtained, and if it exceeds 300 parts by weight, the rubber strength and rubber elasticity of the cured rubber obtained by curing the composition may be deteriorated.

(D) Boric Acid or Boric Acid Compound

Boric acid or a boric acid compound as component (D) is used as a component that imparts self-adhesive properties to the cured product of the composition, and can be used alone or two or more kinds thereof may be used in combination. Specific examples of the boric acid compound include boric acids such as boric anhydride, pyroboric acid, and orthoboric acid, derivatives of boric acid such as trimethyl borate, triethyl borate, and trimethoxyboroxine, and boric anhydride, and polyorganoborosiloxanes obtained by heating and condensing organoalkoxysilanes such as dimethyldimethoxysilane, and dimethyldiethoxysilane, and boric anhydride.

The mixing amount of the component (D) is 0.1 to 50 parts by weight, preferably 0.5 to 40 parts by weight, and more preferably 1 to 35 parts by weight per 100 parts by weight of the organopolysiloxane as component (A). If the mixing amount is less than 0.1 parts by weight, sufficient self-adhesive properties cannot be imparted to the cured product, and if it exceeds 50 parts by weight, this may cause the heat resistance and mechanical strength of the cured product to be deteriorated.

(E) Diorganopolysiloxane Capped at Both Molecular Terminals with Alkoxy Groups

The silicone rubber composition of the present invention preferably contains a diorganopolysiloxane capped at both molecular terminals with alkoxy groups from the viewpoint of self-adhesive properties.

Examples of the diorganopolysiloxane capped at both molecular terminals with alkoxy groups include diorganopolysiloxane capped at both molecular terminals with alkoxy groups represented by the following Formula (2):

$$R^3O(SiR^2{}_2O)_mR^3 \quad (2)$$

wherein $R^2$ is the same or different unsubstituted or substituted monovalent alkyl group or alkoxy group, $R^3$ is the same or different unsubstituted or substituted monovalent alkyl group, and m is an integer of 1 to 100.

In the Formula (2), $R^2$ is the same or different unsubstituted or substituted monovalent alkyl group or alkoxy group, and those having 1 to 8 carbon atoms are generally used, and those having 1 to 4 carbon atoms are particularly preferable. Specific examples include a methyl group, an ethyl group, a propyl group, a butyl group, a methoxy group, an ethoxy group, a propoxy group, and a butoxy group, and a methyl group, an ethyl group, a methoxy group, and an ethoxy group are preferable. $R^3$ is the same or different unsubstituted or substituted monovalent alkyl group, and those having 1 to 8 carbon atoms are generally used, and those having 1 to 4 carbon atoms are particularly preferable. Specific examples include a methyl group, an ethyl group, a propyl group, and a butyl group, and a methyl group and an ethyl group are preferable. m is an integer of 1 to 100, and is preferably an integer of 1 to 50. Particularly, the organopolysiloxane as component (E) preferably has 4 or more alkoxy groups in one molecule.

The mixing amount of the component (E) is preferably 1 to 10 parts by weight, and more preferably 2 to 8 parts by weight, per 100 parts by weight of the component (A). If the mixing amount is too small, an adhesive force due to self-adhesive may be decreased, and if it is too large, bleeding may occur from the rubber surface and the moldability may be deteriorated.

(F) Curing Agent Consisting of Acyl Organic Peroxide

In the present invention, a curing agent consisting of acyl organic peroxide is used.

If it is cured with an alkyl peroxide, vulcanization is inhibited by oxygen, so that there is a risk that vulcanization may not proceed sufficiently by calender roll processing (rolling molding) or extrusion molding. In addition, in the addition reaction, by conventional method using addition vulcanization, in which a platinum addition reaction catalyst is added to an organopolysiloxane having an alkenyl group and an organohydrogenpolysiloxane having a silicon-bonded hydrogen atom that undergoes an addition reaction with the alkenyl group, followed by being cured, there is a disadvantage in that a production range is limited, for example, a hydrosilylation reaction is easily inhibited by catalyst poison, and a storage period is short due to the reaction proceeding even at room temperature. Furthermore, even if it is cured by a combination of a platinum catalyst and organohydrogenpolysiloxane, sufficient self-adhesive properties may not be obtained.

The curing agent consisting of acyl organic peroxide improves these curing agents.

Examples of the acyl organic peroxide include benzoyl peroxide, 2,4-dichlorobenzoyl peroxide, p-methylbenzoyl peroxide, and o-methylbenzoyl peroxide.

The mixing amount of the component (F) is used in an appropriate amount effective for curing, and it is 0.01 to 10 parts by weight and preferably 0.05 to 8 parts by weight per 100 parts by weight of the component (A). If the mixing amount is less than 0.01 parts by weight, the vulcanization reaction does not proceed sufficiently, which may cause deterioration in physical properties such as a decrease in hardness and insufficient rubber strength, and if it exceeds 10 parts by weight, it is economically disadvantageous. In addition, due to a large amount of decomposition product of the curing agent, a sufficient relative dielectric constant may not be obtained.

Other Components

In the silicone rubber composition used in the present invention, as long as the object of the present invention is not impaired, in addition to the above components, as necessary, known fillers and additives in a thermosetting silicone rubber composition such as a filler such as pulverized quartz, diatomaceous earth, and calcium carbonate, a coloring agent, a tear strength improver, a heat resistance improver, a flame retardant improver for a platinum compound or the like, an acid acceptor, a thermal conductivity improver for alumina or silicon nitride, and a release agent may be added as other components. Other components may be used alone or two or more kinds thereof may be used in combination.

Method of Preparing Composition

The millable silicone rubber composition of the present invention can be obtained by mixing the components constituting the composition with a known kneading machine such as a kneader, a Banbury mixer, or a two-roller. In a case where a composition containing the above components (A) to (F) is obtained as a silicone rubber composition, it is preferable that a mixture is obtained by mixing the organopolysiloxane as component (A) and the hydrophobic fumed silica as component (B), then the conductive complex oxide as component (C), the boric acid or boric acid compound as component (D), and the diorganopolysiloxane capped at both molecular terminals with alkoxy groups as component (E) are mixed into the mixture, and the curing agent as component (F) is added to the mixture. In a case where the composition containing the components (A) to (F) further contains other components, it is preferable that a mixture is obtained by mixing the organopolysiloxane as component (A), the hydrophobic fumed silica as component (B), the conductive complex oxide as component (C), the boric acid or boric acid compound as component (D), the diorganopolysiloxane capped at both molecular terminals with alkoxy groups as component (E), and other components, and the curing agent as component (F) is added to the mixture.

Method of Molding Silicone Rubber

As a molding method, a known molding method may be selected according to the shape and size of a target molded product. For example, a self-adhesive high dielectric tape is produced in such a manner that molding into a tape shape or a sheet shape is performed by extrusion molding or roll forming with calender rolls, and the molded product is cut as desired, wound into a roll shape, and cured by a normal pressure hot air vulcanization (HAV) method.

The obtained self-adhesive high dielectric tape is used for the connection portion of the power cable. Specifically, an electric field relaxation layer can be formed by winding the self-adhesive high dielectric tape around a terminal portion such as an intermediate connection portion or a terminal connection portion of the power cable, so that electric stress (line of electric force) can be uniformly dispersed without being concentrated on the connection portion.

Curing Conditions

The curing conditions may be known conditions in the molding method used, and can be set to preferably 10 seconds to 10 minutes at 100° C. to 500° C., more preferably 0.2 to 60 minutes at 110° C. to 450° C., and still more preferably 1 to 45 minutes. In addition, for the purpose of reducing the low molecular siloxane component remaining in the obtained silicone rubber, removing the decomposition product of the organic peroxide in the silicone rubber, and the like, post-curing (secondary curing) may be performed in an oven or the like at 200° C. or higher, preferably 200° C. to 250° C. for 1 hour or longer, preferably about 1 to 70 hours, and more preferably 1 to 10 hours.

The obtained silicone rubber cured product has a relative dielectric constant of preferably 10 or more, more preferably 10 to 50, and still more preferably 11 to 30 in the measurement method described below. If the relative dielectric constant is less than 10, the electric field relaxation effect that disperses the electric field concentrated on the terminal portion of the high-voltage power cable may be insufficient. The volume resistivity is preferably $1.0 \times 10^{12}$ to $1.0 \times 10^{17}$ Ω·cm, more preferably $1.0 \times 10^{12}$ to $5.0 \times 10^{16}$ Ω·cm, and still more preferably $1.0 \times 10^{13}$ to $1.0 \times 10^{16}$ Ω·cm. If the volume resistivity is less than $1.0 \times 10^{12}$ Ω·cm, the insulation is insufficient, which may cause dielectric breakdown due to electric field concentration. In addition, if the volume resistivity exceeds $1.0 \times 10^{17}$ Ω·cm, the target high dielectric properties cannot be obtained.

The elongation at break of the obtained silicone rubber cured product (processed product) is preferably 500% to 1,200%, more preferably 600% to 1,100%, and still more preferably 700% to 1,000%. Within the above range, a highly dielectric tape with high hermeticity can be obtained without a crack and fracture after stretching.

EXAMPLES

Hereinafter, although the present invention is described concretely with reference to Examples and Comparative Examples, the present invention is not limited to these Examples. The kinematic viscosities described in Examples and Comparative Examples are measured values of kinematic viscosities at 25° C. using a Canon-Fenske viscometer described in JIS Z 8803: 2011.

Example 1

75 parts by weight of organopolysiloxane raw rubber consisting of 99.975% by mole of dimethylsiloxane units and 0.025% by mole of dimethylvinylsiloxy units, and having an average polymerization degree of about 6,000, 25 parts by weight of organopolysiloxane raw rubber consisting of 99.85% by mole of dimethylsiloxane units, 0.125% by mole of methylvinylsiloxane units, and 0.025% by mole of dimethylvinylsiloxy units, and having an average polymerization degree of about 6,000, 26 parts by weight of fumed silica (AEROSIL R-972, produced by Nippon Aerosil Co., Ltd.) whose surface having a BET adsorption specific surface area of 130 m$^2$/g was hydrophobized, and 2 parts by weight of dimethylpolysiloxane having silanol groups at both terminals as a dispersant, an average polymerization degree of 4, and a viscosity at 25° C. of 15 mPa·s were added and heated for 2 hours at 170° C. under mixing with a kneader so as to produce a base compound (1).

190 parts by weight of conductive zinc oxide 23-K (produced by HAKUSUI TECH CO., LTD.) obtained by doping zinc oxide with aluminum atoms, as conductive complex oxide having a specific resistance value of 2.5 Ω·m, 8 parts by weight of polymethylborosiloxane (kinematic viscosity: 200 mm$^2$/s) obtained by mixing dimethyldimethoxysilane and boric anhydride at a molar ratio of 1:2 and heating at 150° C. for 1 hour, and 2 parts by weight of dimethylpolysiloxane capped at both terminals with ethoxy groups [4 ethoxy groups in the molecule (kinematic viscosity: 6 mm$^2$/s; the same shall apply hereinafter)] were kneaded to 128 parts by weight of the above compound (1) using a pressure kneader so as to obtain a compound (A). 2.2 parts by weight of p-methylbenzoyl peroxide was mixed to 328 parts by weight of the obtained compound (A) so as to prepare a composition (A).

Example 2

A composition (B) was obtained in the same manner as in Example 1 except for change to 15 parts by weight of fumed silica (AEROSIL R-972, produced by Nippon Aerosil Co., Ltd.) whose surface having a BET adsorption specific surface area of 130 m$^2$/g was hydrophobized, 1.1 parts by weight of dimethylpolysiloxane having silanol groups at both terminals as a dispersant, an average polymerization degree of 4, and a viscosity at 25° C. of 15 mPa·s, and 170 parts by weight of the mixing amount of conductive zinc oxide 23-K (produced by HAKUSUI TECH CO., LTD.) obtained by doping zinc oxide with aluminum atoms, as conductive complex oxide having a specific resistance value of 2.5 Ω·m, and 1.9 parts by weight of p-methylbenzoyl peroxide.

Comparative Example 1

A composition (C) was obtained in the same manner as in Example 1 except for change to 26 parts by weight of fumed silica (AEROSIL 200, produced by Nippon Aerosil Co., Ltd.) whose surface having a BET adsorption specific surface area of 200 m$^2$/g was not hydrophobized, and 5 parts by weight of dimethylpolysiloxane having silanol groups at both terminals as a dispersant, an average polymerization degree of 4 and a viscosity at 25° C. of 15 mPa·s.

Comparative Example 2

A composition (D) was obtained in the same manner as in Example 1 except for change to 26 parts by weight of precipitated silica (NIPSIL-LP, produced by Nippon Silica Co., Ltd.) having a BET adsorption specific surface area of 200 m$^2$/g, and 5 parts by weight of dimethylpolysiloxane having silanol groups at both terminals as a dispersant, an average polymerization degree of 4, and a viscosity at 25° C. of 15 mPa·s.

Comparative Example 3

A composition (E) was obtained in the same manner as in Example 1 except for change to 80 parts by weight of the mixing amount of conductive zinc oxide 23-K (produced by HAKUSUI TECH CO., LTD.) obtained by doping zinc oxide with aluminum atoms, as conductive complex oxide having a specific resistance value of 2.5 Ω·m, and 1.4 parts by weight of p-methylbenzoyl peroxide.

Comparative Example 4

A composition (F) was obtained in the same manner as in Example 1 except that 5 parts by weight of dimethylpolysiloxane having silanol groups at both terminals as a dispersant, an average polymerization degree of 4 and a viscosity at 25° C. of 15 mPa·s and 2.1 parts by weight of p-methylbenzoyl peroxide were used without adding polymethylborosiloxane (kinematic viscosity: 200 mm$^2$/s) obtained by mixing dimethyldimethoxysilane and boric anhydride at a molar ratio of 1:2 and heating at 150° C. for 1 hour and dimethylpolysiloxane capped at both terminals with ethoxy groups [4 ethoxy groups in the molecule (kinematic viscosity: 6 mm$^2$/s)].

Comparative Example 5

A composition (G) was obtained in the same manner as in Example 1 except that instead of p-methylbenzoyl peroxide as a curing agent, 0.82 parts by weight of methylhydrogenpolysiloxane having SiH groups in side chains (dimethylsiloxane.methylhydrogensiloxane copolymer capped at both terminals with trimethylsiloxy groups having polymerization degree of 38 and 0.0074% by mole of SiH groups), 0.16 parts by weight of ethynylcyclohexanol as a reaction control agent, and 0.3 parts by weight of platinum catalyst (1% by weight of Pt concentration) were mixed.

Comparative Example 6

A composition (H) was obtained in the same manner as in Example 1 except that instead of p-methylbenzoyl peroxide as a curing agent, 1.6 parts by weight of 2,5-dimethyl-bis (2,5-t-butylperoxy) hexane (trade name: Perhexa 25B, NOF Corporation) was used.

Method of Measuring Various Physical Properties

For the silicone rubber compositions (A) to (H) prepared in Examples 1 and 2 and Comparative Examples 1 to 6, various physical properties [hardness (durometer A), tensile strength, elongation at break] of rubber were measured using a test cured sheet produced in accordance with JIS K 6249:2003.

Curing Conditions

Test cured sheets having 100 mm square, and each of thickness of 5 mm, 2 mm, and 1 mm were produced by performing pre-cure with molding pressure of 7.8 MPa (80 kgf/cm$^2$) at 120° C. for 10 minutes, and then performing post-cure at 200° C. for 4 hours (secondary vulcanization).

Measurement of Relative Dielectric Constant

For the silicone rubber compositions (A) to (H) prepared in Examples 1 and 2 and Comparative Examples 1 to 6, a square cured product of 100 mm square and 5 mm thickness was produced under the conditions of a molding temperature of 120° C., a molding pressure of 7.8 MPa (80 kgf/cm$^2$), and a molding time of 10 minutes. Thereafter, secondary vulcanization (post-cure) was performed at 200° C. for 4 hours to produce a sample for measuring relative dielectric constant.

Regarding the sample for measuring relative dielectric constant, the relative dielectric constant was measured using an automatic Schering Bridge (device name: DAC-1M-D1) manufactured by Soken Electric Co., Ltd. As electrodes, a main electrode 50 mmϕ, a guard electrode 54×80 mmϕ, and a counter electrode 80 mmϕ were used, and the measurement frequency was 50 Hz. The measured value at an applied voltage of 500 V was read.

Measurement of Volume Resistivity

The volume resistivity was measured in accordance with JIS K 6249:2003 by producing a test rubber sheet having a thickness of 1 mm under the same curing conditions as those of the rubber physical properties.

Adhesive Feel (Hand Peeling Off)

For the silicone rubber compositions (A) to (H) prepared in Examples 1 and 2 and Comparative Examples 1 to 6, a sheet-like cured product having a thickness of 2 mm was produced under the conditions of a molding temperature of 120° C., a molding pressure of 7.8 MPa (80 kgf/cm$^2$), and a molding time of 10 minutes. Thereafter, secondary vulcanization (post cure) was performed at 200° C. for 4 hours to produce a cured sheet. Two sheets of this cured sheet having a width of 25 mm were overlapped and pressure-bonded at 0.5 kgf/cm$^2$ for 8 hours to obtain a cured sheet (adhesive feel (hand peeling off)) sample.

Regarding the adhesive feel (hand peeling off) evaluation, the cured sheet (adhesive feel (hand peeling off)) sample was peeled off by hand, and the sample that was not peeled off was indicated as "○", the sample that was partially peeled off but a pressure joining portion remained was indicated as "Δ", and the sample that was completely peeled off was indicated as "X". In addition, the sample that is hard to peel has high hermeticity. The results are indicated in Table 1.

Normal Pressure Hot Air Vulcanization (HAV) Test

Regarding the production of the cured sheet sample, a 1 mm thick sheet was produced by using the silicone rubber compositions (A) to (H) prepared in Examples 1 and 2 and Comparative Examples 1 to 6 with a two-roll mill, this 1 mm thick sheet was hot-air vulcanized under normal pressure with a hot air dryer at 300° C. for 1 minute to produce a silicone rubber molded product, and the foaming and hardness of the silicone rubber cross section were checked. The results are indicated in Table 1.

TABLE 1

| | | Example | | Comparative Example | | | | | |
|---|---|---|---|---|---|---|---|---|---|
| | Component (parts by weight) | 1 | 2 | 1 | 2 | 3 | 4 | 5 | 6 |
| (A) | Organopolysiloxane raw rubber consisting of 99.975% by mole of dimethylsiloxane units and 0.025% by mole of dimethylvinylsiloxy units (Average polymerization degree 6,000) | 75 | 75 | 75 | 75 | 75 | 75 | 75 | 75 |
| | Organopolysiloxane raw rubber consisting of 99.85% by mole of dimethylsiloxane units, 0.125% by mole of methylvinylsiloxane units, and 0.025% by mole of dimethylvinylsiloxy units (Average polymerization degree 6,000) | 25 | 25 | 25 | 25 | 25 | 25 | 25 | 25 |
| (B) | Fumed silica (AEROSIL R-972) | 26 | 15 | | | 26 | 26 | 26 | 26 |
| (C) | Conductive zinc oxide 23-K | 190 | 170 | 190 | 190 | 80 | 190 | 190 | 190 |
| (D) | Polymethylborosiloxane (kinematic viscosity 200 mm$^2$/s) | 8 | 8 | 8 | 8 | 8 | | 8 | 8 |
| (E) | Dimethylpolysiloxane capped at both terminals with ethoxy groups (kinematic viscosity 6 mm$^2$/s) | 2 | 2 | 2 | 2 | 2 | | 2 | 2 |
| | Dimethylpolysiloxane capped at both terminals with silanol groups (average polymerization degree of 4; viscosity of 15 mPa · s) | 2 | 1.1 | 5 | 5 | 2 | 5 | 2 | 2 |
| (F) | p-methylbenzoyl peroxide | 2.2 | 1.9 | 2.2 | 2.2 | 1.4 | 2.1 | | |
| (B)' | Fumed silica (AEROSIL 200) | | | 26 | | | | | |
| | Precipitated silica (NIPSIL-LP) | | | | 26 | | | | |
| (F)' | Dimethylsiloxane•methylhydrogensiloxane copolymer capped at both terminals with trimethylsiloxy groups (Polymerization degree of 38 and 0.0074% by mole of SiH group) | | | | | | | | 0.82 |

TABLE 1-continued

| | Component (parts by weight) | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| | Platinum catalyst (1% by weight of Pt concentration) | | | | | | | 0.3 | |
| | Ethynyl cyclohexanol | | | | | | | 0.16 | |
| | Perhexa 25B | | | | | | | | 1.6 |
| Evaluation results | Hardness: Type A | 56 | 53 | 63 | 57 | 51 | 55 | 59 | 69 |
| | Tensile strength (MPa) | 3.1 | 3.1 | 3.7 | 3.3 | 3.2 | 2.4 | 2.7 | 4.2 |
| | Elongation at break (%) | 800 | 850 | 720 | 760 | 770 | 300 | 620 | 260 |
| | Volume resistivity ($\Omega \cdot cm$) | $2.8 \times 10^{14}$ | $2.4 \times 10^{14}$ | $1.5 \times 10^{14}$ | $7.3 \times 10^{14}$ | $9.6 \times 10^{15}$ | $5.5 \times 10^{13}$ | $3.3 \times 10^{14}$ | $9.8 \times 10^{14}$ |
| | Relative dielectric constant | 23.2 | 21.1 | 22.6 | 24.8 | 9.4 | 38.6 | 23.7 | 22.3 |
| | Self-adhesive properties (hand peeling) | ○ | ○ | ○ | ○ | ○ | X | X | ○ |
| | HAV test (Dryer: 300° C. × 1 min) Foaming | ○ | ○ | X | X | ○ | ○ | ○ | Unvulcanized |
| | HAV test (Dryer: 300° C. × 1 min) Hardness: Type A | 55 | 53 | 61 | 57 | 50 | 55 | 60 | Unvulcanized |

The invention claimed is:

1. A self-adhesive high dielectric silicone rubber composition comprising:
   (A) 100 parts by weight of an organopolysiloxane represented by an average compositional formula (1) and having, in a molecule, at least two alkenyl groups bonded to silicon atoms:

$$R^1{}_n SiO_{(4-n)/2} \quad (1)$$

wherein, $R^1$ represents the same or different, unsubstituted or substituted monovalent hydrocarbon group and n is a positive number of 1.95 to 2.04;
   (B) 10 to 100 parts by weight of hydrophobic fumed silica having a specific surface area as measured by a BET adsorption method of 50 m²/g or larger;
   (C) 100 to 300 parts by weight of a conductive complex oxide;
   (D) 0.1 to 50 parts by weight of a polyorganoborosiloxane;
   (E) 1 to 10 parts by weight of a diorganopolysiloxane capped at both molecular terminals with alkoxy groups; and
   (F) 0.01 to 10 parts by weight of a curing agent consisting of acyl organic peroxide,
   wherein the self-adhesive high dielectric silicone rubber composition is able to be hot-air vulcanized under normal pressure by extrusion molding or roll forming with calender rolls.

2. The self-adhesive high dielectric silicone rubber composition according to claim 1, wherein the conductive complex oxide as component (C) is a solid solution of zinc oxide and aluminum oxide and/or a solid solution of zinc oxide and titanium oxide, and a specific resistance value of the conductive complex oxide is 0.1 to 10.0 $\Omega \cdot m$.

3. The self-adhesive high dielectric silicone rubber composition according to claim 1 or 2, wherein an average particle size of the conductive complex oxide as component (C) is 0.8 μm or less.

4. The self-adhesive high dielectric silicone rubber composition according to claim 1, wherein an elongation at break of a cured product of the silicone rubber composition is 500% to 1,200%.

5. The self-adhesive high dielectric silicone rubber composition according to claim 1, wherein a relative dielectric constant of the cured product of the silicone rubber composition is 10 or more, and a volume resistivity is $1.0 \times 10^{12}$ to $1.0 \times 10^{17}$ $\Omega \cdot cm$.

6. The self-adhesive high dielectric silicone rubber composition according to claim 1 for a self-adhesive high dielectric tape that is wound around a terminal portion of a power cable to alleviate an electric field concentrated on the terminal portion of the power cable.

7. A self-adhesive high dielectric tape comprising a cured product of the self-adhesive high dielectric silicone rubber composition according to claim 1.

* * * * *